Figure 1:
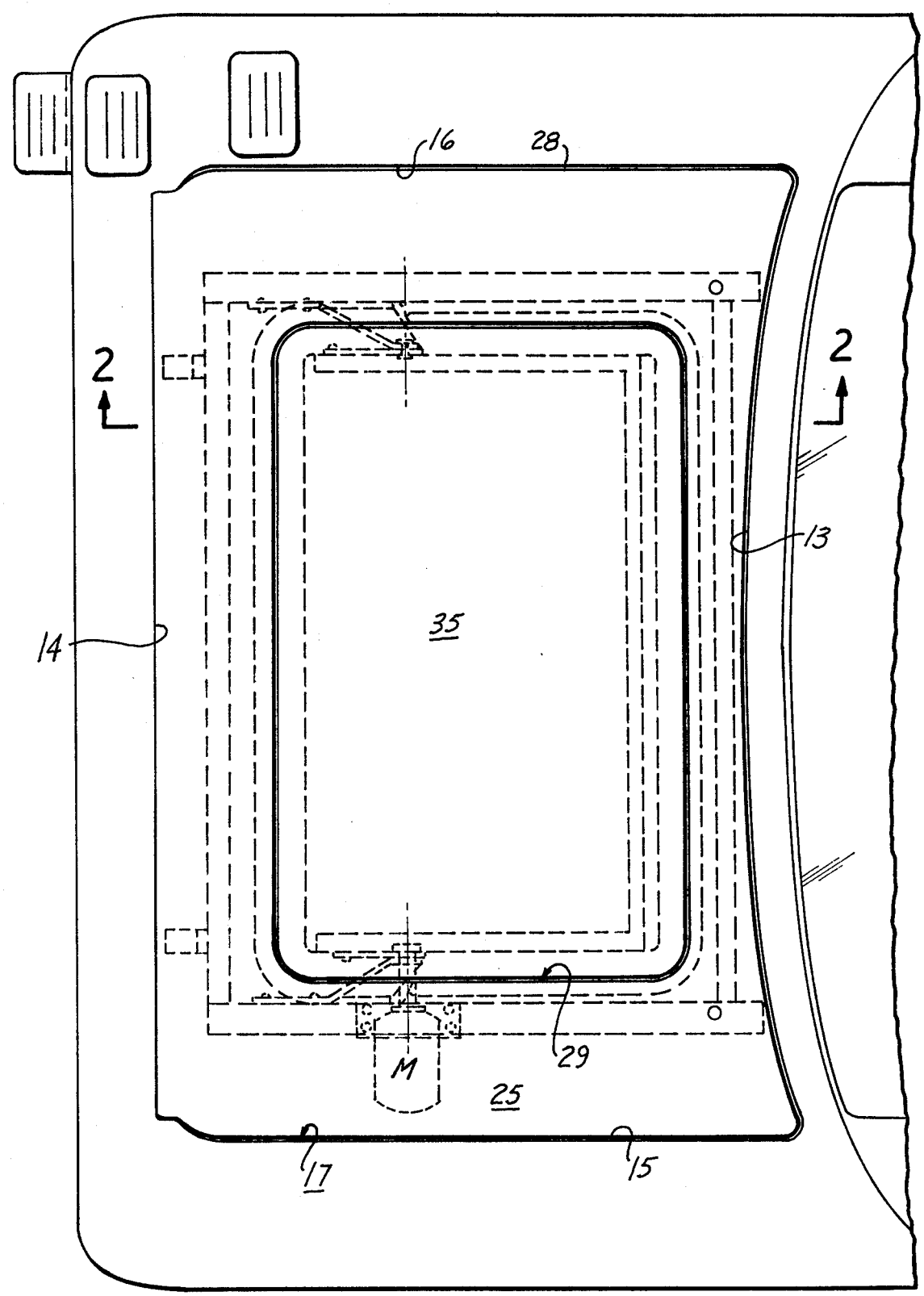

United States Patent [19]

Cerf et al.

[11] 4,103,961

[45] Aug. 1, 1978

[54] RUMBLE SEAT

[76] Inventors: Donald B. Cerf; Perry J. Dreibus, 5435 Corning Ave., Los Angeles, Calif. 90056

[21] Appl. No.: 739,544

[22] Filed: Nov. 8, 1976

[51] Int. Cl.² .............................................. B60N 1/06
[52] U.S. Cl. .................................. 296/63; 296/99 A; 297/353
[58] Field of Search .................. 296/99 A, 63, 66, 69; 5/24; 297/353, 14, 330

[56] References Cited

U.S. PATENT DOCUMENTS

| | | | |
|---|---|---|---|
| 1,796,081 | 3/1931 | Bundy | 296/66 |
| 2,043,804 | 6/1936 | Montgomery | 296/66 |
| 2,880,033 | 3/1959 | Shelton | 296/66 |
| 3,290,086 | 12/1966 | Petrak | 296/63 |
| 3,323,828 | 6/1967 | Esche | 296/63 |
| 3,413,031 | 11/1968 | Gafvert | 296/63 |
| 3,934,927 | 1/1976 | Zur | 297/530 |
| 3,954,296 | 5/1976 | Patnode | 296/99 A |

*Primary Examiner*—Joseph F. Peters, Jr.
*Assistant Examiner*—John A. Carroll
*Attorney, Agent, or Firm*—Donald D. Mon

[57] ABSTRACT

A rumble seat construction for an automobile body. The existing trunk lid is replaced by a support lid having a rumble seat back support pivoted thereto. The back support is adapted to open and close an aperture in the support lid. The back support can be rotated between the open and closed positions. When closed, it closes the trunk cavity. When open, it forms a backrest. A seat is removably attached to the bottom of the trunk forward of the back support in the open position. The back support means raises and lowers with the lid.

15 Claims, 2 Drawing Figures

RUMBLE SEAT

This invention relates to automobile bodies, and in particular to a rumble seat which can be installed in existing automobile trunks.

The conventional rumble seat is well-known. It includes a cavity with a seat in the bottom and a back support pivoted to the body itself, which can be opened and closed. A problem with the conventional rumble seat construction is that it precludes the effective use of the space as a trunk. It is an object of this invention to provide a means whereby a rumble seat can be provided in such a way as to be compatible with a conventional trunk construction, and be provided as a selectible alternative to the existing trunk construction.

This invention is carried out by removing and replacing the existing trunk lid with a support lid. The support lid covers the same opening that the trunk lid formerly did. It is customarily attached to the existing hinge means for the existing trunk lid and thereby constitutes a replacement for it which provides the same functions, plus the additional functions of a rumble seat. The trunk lid can be replaced whenever it is preferred.

A back support is fitted in an aperture in the support lid. The back support is pivoted to the support lid and can be raised to provide a back support for a backrest, for example a cushion, or lowered to close and seal the aperture. A bottom seat cushion is removably restrained to the floor of the trunk where it will extend ahead of the back support when the rumble seat is open. The bottom seat cushion can be picked up and either be removed from the trunk or be put in a convenient place in the trunk so that the trunk can be used as a trunk when the back support is closed. It can also be left in place when the rumble seat is closed. When the support lid is raised on the lid hinges, the back support and any backrest it carries raises with the support lid, giving complete access to the trunk.

According to a preferred but optional feature of the invention, said backrest is removably attached to the back support so as to enable substantially the entire trunk volume to be used as a trunk when rumble seat availability is not desired.

Figure 2:
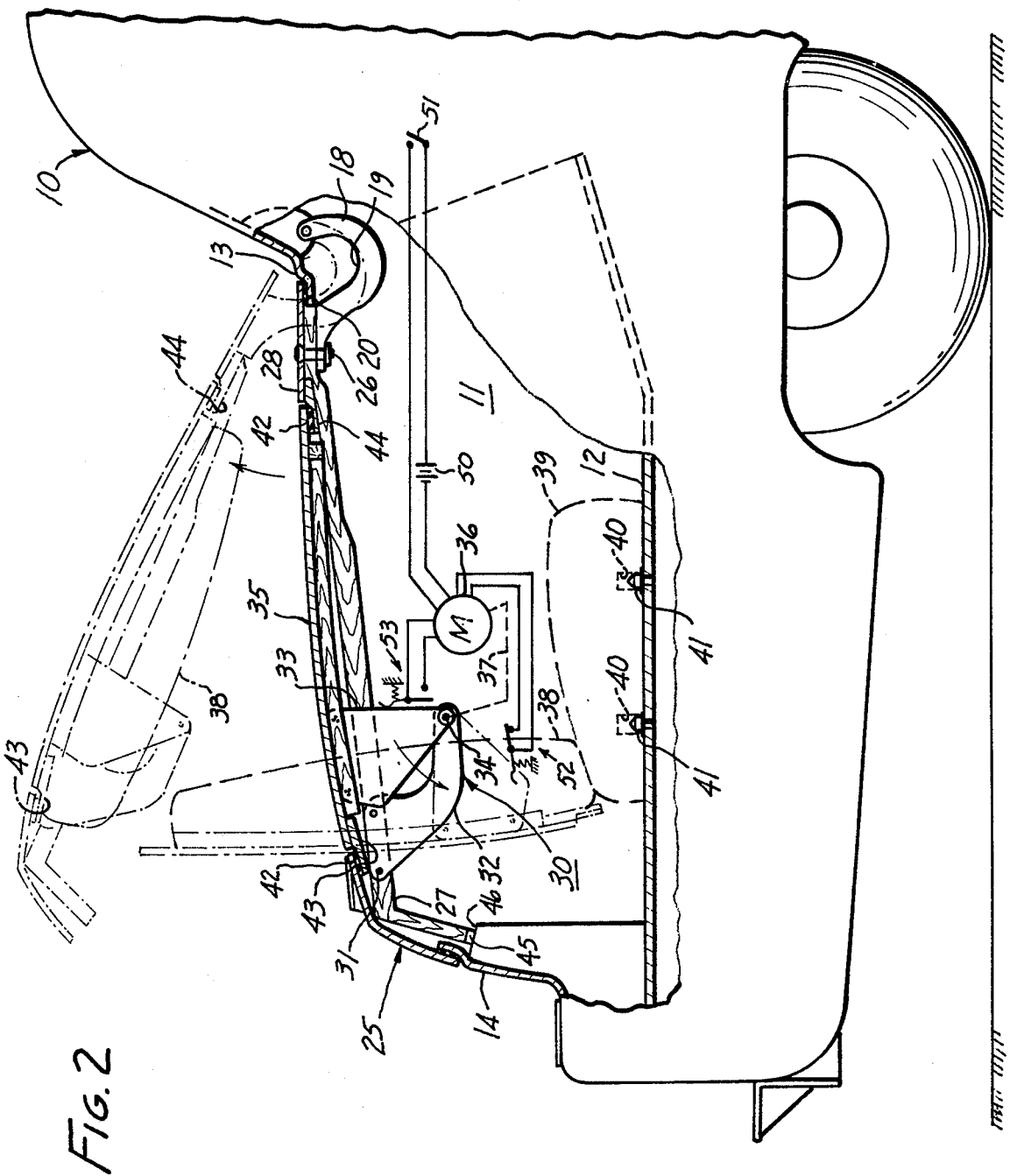

The above and other features of this invention will be fully understood from the following detailed description and the accompanying drawings, in which:

FIG. 1 is a top view of a rumble seat construction according to the invention; and FIG. 2 is a side elevation, partly in cutaway cross-section, taken at line 2—2 of FIG. 1.

In FIG. 1 there is shown the rear end of an automobile body 10 of the sedan type. Classically, this type of body has a trunk cavity 11, a trunk floor 12, a trunk forward bulkhead 13, a trunk rear bulkhead 14, and truck side ledges 15, 16. These form a trunk opening 17 which can be closed by a trunk lid (not shown).

The trunk lid is mounted to the automobile body by means of a hinge 18. The hinge has U-shaped arms 19 which allow it to swing upwardly and clear the forward edge 20 of bulkhead 13. A lock (not shown) is provided to hold the lid in a closed position. This trunk and trunk lid construction is customary and is found in most substantial sedans. Modern Cadillacs are an example.

In this invention, the existing trunk lid is removed and replaced by a support lid 25, which is attached to the existing hinge 18 by separable fasteners 26. Then the original trunk lid can readily be replaced if desired. The outer edges of the support lid are shaped to make a fluid sealing contact with all of the edges of the opening, exactly as the replaced trunk lid did. The support lid is adapted to swing from the closed position shown in solid line in FIG. 2 to the open position shown in dashed line in FIG. 2. It is held down in the closed position by the existing lock. When the lock is released it can swing upwardly on hinges 18 to the upper position to give access to the trunk.

The support lid includes structure 27 to which a peripheral fairing 28 is attached. This fairing has an aperture 29 to receive part of the rumble seat. The structure provides a strong means for attachment to the hinge. It supports a pivot means 30 which is attached to it by fasteners 31. The pivot means includes a first arm 32 attached to the structure and a second arm 33 connected to the first arm by a pivot pin 34. A back support 35 is mounted to the second arm. It pivots around pin 34 between the positions shown in solid and dashed lines in FIG. 2. The structure includes abutment means 45 that bear against a stop 46 in the trunk when the lid is closed to give better backing to the rumble seat.

Electric motor 36 is mounted to the structure and connected by transmission means 37 to the second arm so as to power the movement of the seat back support between the two positions. The motor may be a DC motor operated from battery 50 through an off-on directional switch 51 limited by limit switches 52, 53 which shut down the motor when the back support has reached the limit of its movement in a respective direction. The motor may be provided with field control means or other overload means which will cause it to shut down or stop exerting torque when the mechanism is jammed. This will prevent injury to objects which might be caught between the back support and the fairing while the device is operating.

A backrest 38 is removably attached to the back support means by separable fasteners (not shown) and is carried by it. Backrest 38 may be a cushion. When it is removed, the volume it occupied becomes available for trunk storage.

A seat cushion 39 is placed on the floor of the trunk. Receptacles 40 are formed in the bottom of the seat cushion which face downwardly. Locating pins 41 project upwardly from the floor and enter the receptacle so as to prevent the seat from moving forwardly and backwardly. The seat cushion may be lifted off of the locating pins and removed from the trunk if the seat is not desired or moved to a more convenient position location in the trunk itself. Furthermore, the locating pins may themselves be seated in holes in the floor, or in receptacles so as to be readily removable. Therefore, they do not interfere with the full use of the trunk floor. When brackrest 38 and seat cushion 39 are both removed, the trunk is substantially entirely available for storage as though the rumble seat means had not been provided. Thus, when rumble seat availability is not desired, the rumble seat mechanism can remain in place, except for the cushions, and the trunk almost entirely is available as such.

Seal means 42 is provided peripherally around the major portion of the periphery of the aperture so as to form a seal around the back support when it is closed. An underlaying flange 43 is formed on the rearward portion of the back support, and another underlaying flange 44 is formed on the underneath portion of the fairing around the aperture at the forward end so that the portion of the back support which moves upwardly to make its seal makes an upwardly-pressed seal, and the forward portion which moves downwardly makes a downwardly-pressed seal.

This invention provides a rumble seat means which can readily be substituted for the existing trunk lid and provide all the existing trunk lid functions. When it is closed onto the trunk opening, the rumble seat can be opened and used as such, or simply remain closed and function as a trunk lid. When the back support is closed, the entire means carried by the structure can be lifted as a trunk lid. The bottom seat cushion and backrest can readily be removed and stored outside the automobile, or be moved to a more convenient place in the trunk when not in use as a seat to make the trunk area useful as such.

This invention is not to be limited by the embodiment shown in the drawings and described in the description, which is given by way of example and not of limitation, but only in accordance with the scope of the appended claims.

I claim:

1. A rumble seat for use in the trunk cavity of an automobile body, said cavity having a floor, and an opening bounded by a forward edge, a rear bulkhead and a pair of spaced apart side ledges, and hinge means mounted to the body for pivotally mounting a trunk lid for upward and downward movement to open and to close the said opening, the improvement comprising: a support lid having structure attachable to said hinge means to replace said trunk lid; a fairing attached to the structure and so proportioned and arranged as to close on the periphery of said opening in the same manner as the replaced trunk lid, there being an aperture in said fairing; a back support; pivot means mounted to said structure and said back support, said back support being so proportioned and arranged as to close said aperture in one position and to be pivoted by the pivot means to open and form a back restraint in another position; motor means for moving said back support between said positions; a seat cushion to rest on the floor of the trunk without upward support by the support lid or by the back support; and restraint means restraining the seat cushion from forward and backward movement.

2. Apparatus according to claim 1 in which the rear portion of the back support underlays a portion of the fairing and a forward portion overlays a forward portion thereof, and in which seal means is disposed between said portions to provide a seal when the back support is closed.

3. Apparatus according to claim 1 in which limit means is provided for terminating the operation of the motor means in the respective two positions.

4. Apparatus according to claim 1 in which said structure includes abutment means adapted to bear against some portion of the body to limit movement of the support lid in the direction of closure.

5. Apparatus according to claim 1 in which the seat cushion is removable from the trunk floor.

6. Apparatus according to claim 2 in which limit means is provided for terminating the operation of the motor means in the respective two positions.

7. Apparatus according to claim 6 in which said structure includes abutment means adapted to bear against some portion of the body to limit movement of the support lid in the direction of closure.

8. Apparatus according to claim 7 in which the seat cushion is removable from the trunk floor.

9. Apparatus according to claim 1 in which a backrest is removably attachable to the back support.

10. Apparatus according to claim 8 in which a backrest is removably attachable to the back support.

11. In combination: an automobile body having a trunk cavity, said cavity having a floor, and an opening bounded by a forward edge, a rear bulkhead and a pair of spaced apart side ledges, and hinge means mounted to the body for pivotally mounting a trunk lid for upward and downward movement to open and to close the said opening; and rumble seat means comprising: a support lid having structure attachable to said hinge means to replace said trunk lid; a fairing attached to the structure and so proportioned and arranged as to close on the periphery of said opening in the same manner as the replaced trunk lid, there being an aperture in said fairing; a back support; pivot means mounted to said structure and said back support, said back support being so proportioned and arranged as to close said aperture in one position and to be pivoted by the pivot means to open and form a back restraint in another position; motor means for moving said back support between said positions; a seat cushion to rest on the floor of the trunk without upward support by the support lid or by the back support; and restraint means restraining the seat cushion from forward and backward movement.

12. Apparatus according to claim 11 in which the rear portion of the back support underlays a portion of the fairing and a forward portion overlays a forward portion thereof, and in which seal means is disposed between said portions to provide a seal when the back support is closed.

13. Apparatus according to claim 11 in which limit means is provided for terminating the operation of the motor means in the respective two positions.

14. Apparatus according to claim 11 in which said structure includes abutment means adapted to bear against some portion of the body to limit movement of the support lid in the direction of closure.

15. Apparatus according to claim 11 in which a backrest is removably attachable to the back support.

* * * * *